(12) United States Patent
Yamazaki et al.

(10) Patent No.: US 8,208,859 B2
(45) Date of Patent: *Jun. 26, 2012

(54) RADIO COMMUNICATION DEVICE AND RADIO COMMUNICATION METHOD

(75) Inventors: Chiharu Yamazaki, Yokohama (JP); Shigeru Kimura, Yokohama (JP); Takeshi Toda, Yokohama (JP); Kenta Okino, Yokohama (JP)

(73) Assignee: Kyocera Corporation, Kyoto (JP)

( * ) Notice: Subject to any disclaimer, the term of this patent is extended or adjusted under 35 U.S.C. 154(b) by 296 days.

This patent is subject to a terminal disclaimer.

(21) Appl. No.: 12/442,283

(22) PCT Filed: Sep. 20, 2007

(86) PCT No.: PCT/JP2007/068311
§ 371 (c)(1),
(2), (4) Date: Feb. 23, 2010

(87) PCT Pub. No.: WO2008/035747
PCT Pub. Date: Mar. 27, 2008

(65) Prior Publication Data
US 2010/0159844 A1 Jun. 24, 2010

(30) Foreign Application Priority Data
Sep. 21, 2006 (JP) ................................. 2006-256542

(51) Int. Cl.
*H04B 1/00* (2006.01)
*H04B 15/00* (2006.01)
(52) U.S. Cl. ............................ 455/63.4; 455/69; 455/73
(58) Field of Classification Search .................... 455/69, 455/73, 561, 562.1, 63.4
See application file for complete search history.

(56) References Cited

U.S. PATENT DOCUMENTS

| 7,103,119 | B2 | 9/2006 | Matsuoka et al. |
| 7,565,171 | B2 * | 7/2009 | Doi et al. .................. 455/562.1 |
| 2004/0033818 | A1 | 2/2004 | Nakamura |

FOREIGN PATENT DOCUMENTS

| JP | 2002-171214 | 6/2002 |
| JP | 2002-198878 | 7/2002 |
| JP | 2003-198508 | 7/2003 |
| KR | 20040096394 A | 11/2004 |

OTHER PUBLICATIONS

Korean language office action dated Jun. 27, 2011 and its English language translation for corresponding Korean application 1020097005750 cites the foreign patent document above.
Japanese language office action and its English language translation dated Dec. 13, 2011 issued in corresponding Japanese application 2006256542.

* cited by examiner

*Primary Examiner* — Tuan H Nguyen
(74) *Attorney, Agent, or Firm* — DLA Piper LLP (US)

(57) ABSTRACT

A radio communication device according to the present invention is a radio communication device which adaptively controls directivity of transmission radio signals by use of a plurality of element antennas on the basis of received radio signals received from a counterpart radio communication device that is a communication target radio communication device, the transmission radio signals being to be transmitted to the counterpart radio communication device, the radio communication device comprising: a propagation path state detector configured to detect a fluctuation state of a propagation path to the counterpart radio communication device on the basis of the received radio signal; and a transmission controller configured to control a phase of the transmission radio signal on the basis of the fluctuation state of the propagation path detected by the propagation path state detector.

15 Claims, 10 Drawing Sheets

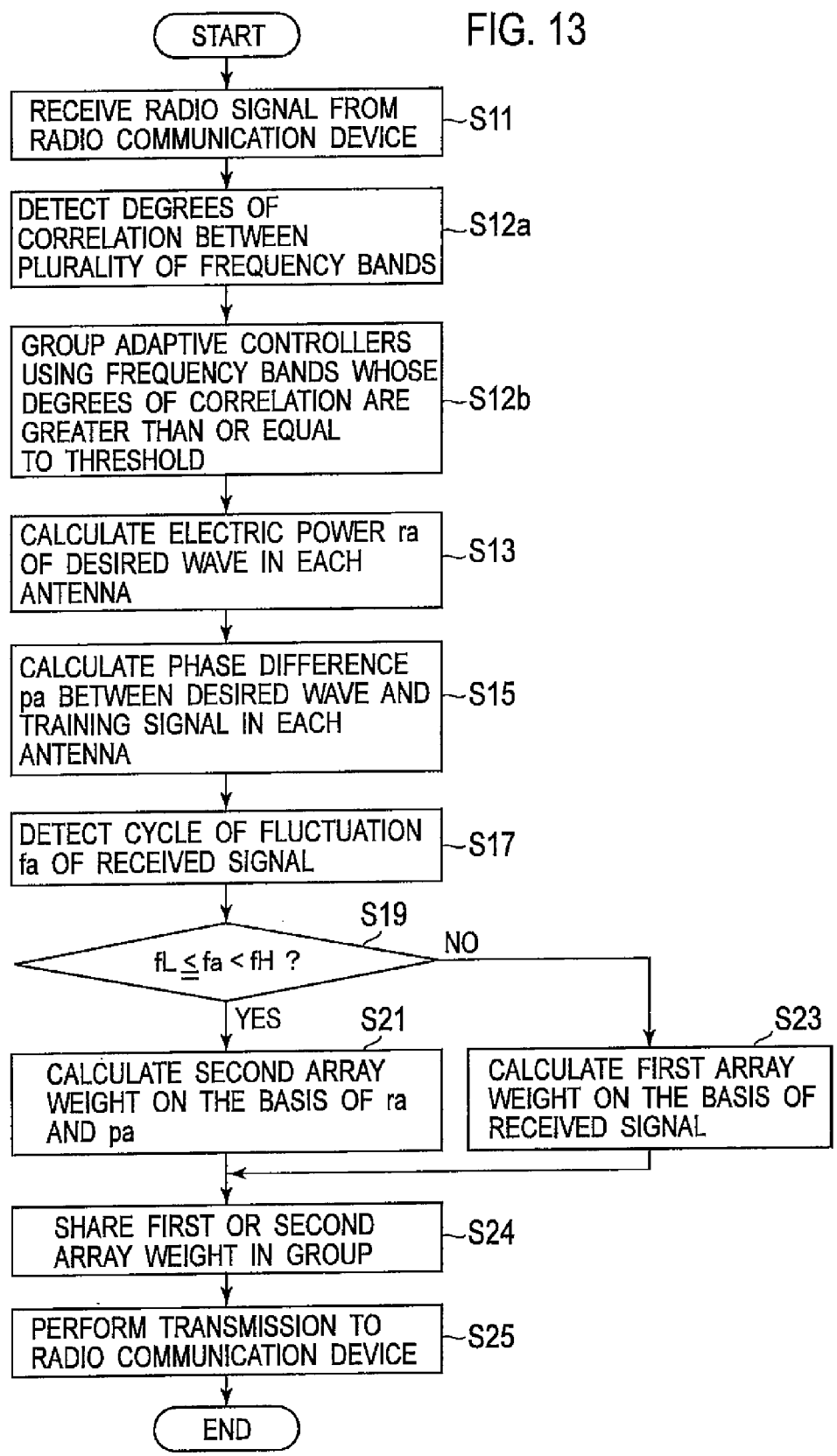

RADIO COMMUNICATION DEVICE AND RADIO COMMUNICATION METHOD

TECHNICAL FIELD

The present invention relates to a radio communication device and a radio communication method in which directivity of radio signals to be transmitted to a communication target radio communication device is adaptively controlled by use of a plurality of element antennas on the basis of radio signals received from the communication target radio communication device.

BACKGROUND ART

Conventionally, in a radio communication system such as a mobile communication system, there has been widely used adaptive array control that adaptively controls directivity of radio signals by using a plurality of element antennas, the radio signals being to be transmitted from a radio base station to a communication target radio communication device, for example, a radio communication terminal. With the adaptive array control, directivity of radio signals can be controlled depending on a position of the radio communication terminal.

However, a radio communication system using the adaptive array control has a problem that directivity of radio signals to be transmitted according to a position of a radio communication terminal cannot be controlled appropriately if the radio communication terminal moves during ongoing communications.

Hence, there is proposed a method of estimating Doppler variations (Doppler frequencies) on the basis of radio signals received from the radio communication terminal, and controlling the directivity of the radio signals by using a predetermined number of element antennas in the ascending order of the estimated Doppler variations (for example, Patent Document 1).

With such a method, element antennas with small Doppler variations are selected, it is believed that excellent directivity of the radio signals can be ensured even when the radio communication terminal moves during ongoing communications.

Patent Document 1: Japanese Patent Application Publication No. 2003-198508 (Page 8, FIG. 5)

DISCLOSURE OF THE INVENTION

Meanwhile, around the radio communication terminal, periodic signals periodically having peaks of electric power values like a standing wave appear due to radio signals transmitted from the radio base station. In general, a wavelength of such a periodic signal is almost half of a wavelength of a radio signal transmitted from the radio base station. When the frequency of the radio signal is in a 2 GHz-band, for example, and if it is assumed that the wavelength of the periodic signal is almost half, the wavelength of the periodic signal is approximately 7.5 cm.

That is, when a radio communication terminal or an object (e.g., a vehicle) existing around the radio communication terminal moves at high speed (100 km/h or higher), there are some cases in which the state of a propagation path between the radio base station and the radio communication terminal has drastically changed at the time when the radio communication terminal receives a radio signal regulated by the radio base station through the adaptive array control. Thus, there is a problem of degrading the communication quality of radio signals received by the radio communication terminal.

Specifically, when the radio communication terminal or the object existing around the radio communication terminal moves at high speed, the radio communication terminal moves to a position where an electric power value of a periodic signal is off peak and thus the communication quality of the radio signal received by the radio communication terminal is significantly degraded.

Hence, the present invention has been made in light of such circumstances, and it is an objective of the present invention to provide a radio communication device and a radio communication method capable of suppressing degradation of the communication quality even in the case where the state of the propagation path to a radio communication device rapidly fluctuates due to high-speed movement of a communication target radio communication device or an object existing around the communication target radio communication device.

In order to solve the aforementioned problem, the present invention includes the following features. First, a first aspect of the present invention is summarized as a radio communication device (for example, radio base station 100) which adaptively controls directivity of a transmission radio signal (downlink signals RSdown) by use of a plurality of element antennas on the basis of a received radio signal (uplink signals RSup) received from a counterpart radio communication device (for example, radio communication terminal 200) that is a communication target radio communication device, the transmission radio signal being to be transmitted to the counterpart radio communication device, the radio communication device comprising: a propagation path state detector (desired wave power calculator 107) configured to detect a fluctuation state of a propagation path to the counterpart radio communication device on the basis of the received radio signal; and a transmission controller (phase calculator 111) configured to control a phase of the transmission radio signal on the basis of the fluctuation state of the propagation path detected by the propagation path state detector.

According to the aspect, since the radio communication device transmits a transmission radio signal whose phase is controlled on the basis of the detected fluctuation state of the propagation path, to the counterpart radio communication device, the radio communication device can transmit the transmission radio signal whose phase is controlled appropriately according to the fluctuation state of the propagation path even when the propagation path to the counterpart radio communication device fluctuates. Consequently, according to the aspect, the radio communication device can suppress degradation of communication quality even when the state of the propagation path to the counterpart radio communication device rapidly fluctuates because the counterpart radio communication device or an object existing around the counterpart radio communication device moves at high speed (100 kg/h or higher).

A second aspect of the present invention is summarized as the radio communication device according to the first aspect, further comprising: a known signal storage unit configured to store a signal transmitted from the counterpart radio communication device as a first known signal, wherein the propagation path state detector detects a second known signal whose amplitude and phase are known, from the received radio signal, and the transmission controller changes the phase of the transmission radio signal on the basis of a phase difference between the first known signal stored in the known signal storage unit and the second known signal detected by the propagation path state detector.

According to the aspect, since the radio communication device is detects the fluctuation state of the propagation path on the basis of the phase difference between the received radio signal and the stored known signal, the radio communication device can change the phase difference of the transmission radio signal more appropriately.

A third aspect of the present invention is summarized as the radio communication device according to the second aspect, wherein the propagation path state detector detects a received power value of the received radio signal, and the transmission controller zs changes the phase of the transmission radio signal when an amount of fluctuation of the received power value of the received radio signal detected by the propagation path state detector is less than or equal to a predetermined threshold.

According to the aspect, the radio communication device can change the phase more appropriately according to the variation of received power value, for example, when the variation of the received power value is less than or equal to the predetermined threshold, or is greater than the predetermined threshold, for example.

A fourth aspect of the present invention is summarized as the radio communication device according to the second aspect, wherein the propagation path state detector detects a received power value of the received radio signal; and the transmission controller reverses the phase of the transmission radio signal when the amount of fluctuation of the received power value of the received radio signal detected by the propagation path state detector is less than or equal to a predetermined threshold.

According to the aspect, since the radio communication device reverses the phase and transmits the transmission radio signal when the variation of the received power value is less than or equal to the predetermined threshold, the radio communication device can determine an amount of variation of the received power due to the fluctuation of the propagation path, change the phase of the transmission radio signal appropriately, and then transmit the transmission radio signal.

A fifth aspect of the present invention is summarized as the radio communication device according to the third aspect, wherein the transmission controller determines the predetermined threshold on the basis of a result of a comparison between the cycle of fluctuation identified by the propagation path state detector and processing time from the time of receiving the received radio signal from the counterpart radio communication device to the time of transmitting the transmission radio signal.

According to the aspect, determining the predetermined threshold on the basis of the processing time and the cycle of fluctuation of the received radio signal, the radio communication device can determine an appropriate predetermined threshold in consideration of the fluctuation of the received radio signal and the processing time period from reception to transmission.

A sixth aspect of the present invention is summarized as the radio communication device according to the second aspect, wherein the transmission controller controls an amount of change of the is phase of the transmission radio signal, according to the amount of fluctuation of the phase difference.

According to the aspect, the radio communication device can control the amount of change to have an appropriate phase according to the phase difference of the received radio signal, and transmit the transmission radio signal.

A seventh aspect of the present invention is summarized as the radio communication device according to the sixth aspect, wherein the transmission controller advances the phase of the transmission radio signal when the amount of fluctuation of the phase difference increases.

According to the aspect, when the amount of fluctuation in the phase difference increases, the radio communication device can transmit the transmission radio signal whose phase is advanced accordingly and changed appropriately. In other words, the radio communication device can correct the phase of the transmission radio signal in the same direction as that of the variation of the phase difference.

An eighth aspect of the present invention is summarized as the radio communication device according to the sixth aspect, wherein the transmission controller delays the phase of the transmission radio signal when the amount of fluctuation of the phase difference decreases. In sum, the phase of the phase of the transmission radio signal can be corrected in the same direction of the fluctuation of the phase difference.

According to the aspect, when the variation of the phase difference decreases, the radio communication device can transmit the transmission radio signal with the phase delayed accordingly and changed appropriately.

A ninth aspect of the present invention is summarized as the radio communication device according to the second aspect, wherein the transmission controller judges an amount of fluctuation between received power values on the basis of the received power values of the received radio signal at least at first timing and at second timing that is later than the first timing, and changes the phase of the transmission radio signal on the basis of the phase difference of the received radio signal at the first timing, if the judged amount of fluctuation of the received power value shows a decrease.

According to the aspect, the radio communication device can change the phase of the transmission radio signal in consideration of the variation of the received power values at the first timing and the second timing.

A tenth aspect of the present invention is summarized as the radio communication device according to the second aspect, wherein the transmission controller judges an amount of fluctuation between received power values on the basis of the received power values of the received radio signal at least at first timing and at second timing that is later than the first timing, and changes the phase of the transmission radio signal on the basis of the phase difference of the received radio signal at the second timing, if the judged amount of fluctuation of the received power value shows an increase.

An eleventh aspect of the present invention is summarized as the radio communication device according to the fifth aspect, wherein the propagation path state detector detects a cycle of Doppler variation of the received radio signal as the cycle of fluctuation.

According to the aspect, the radio communication device can more accurately detect a cycle of fluctuation from a cycle of Doppler variation.

A twelfth aspect of the present invention is summarized as the radio communication device according to the fifth aspect, wherein the propagation path state detector detects the cycle of fluctuation of the electric power value of the received radio signal as the cycle of fluctuation.

According to the aspect, the radio communication device can more accurately detect the cycle of fluctuation of the state of the propagation path from the cycle of fluctuation of the electric power value of the received radio signal.

A thirteenth aspect of the present invention is summarized as the radio communication device according to the fifth aspect, further comprising: an antenna correlation detector (antenna correlation detector 121) configured to detect degrees of correlation between received radio signals respectively received by the plurality of element antennas, wherein the transmission controller determines the predetermined threshold on the basis of the degrees of correlation detected by the antenna correlation detector.

According to the aspect, the radio communication device can determine a more appropriate threshold on the basis of the correlation of the received radio signal in each element antenna in consideration of the state of the propagation path affected by the high or low degree of correlation.

A fourteenth aspect of the present invention is summarized as the radio communication device according to the first aspect, further comprising an antenna selector (antenna selector 131) configured to select at least any one of the element antennas on the basis of a state of the received radio signal, wherein the transmission controller transmits the transmission radio signal via the element antenna selected by the antenna selector.

According to the aspect, the radio communication device can select, for example, an antenna at which the state of received radio signal is good or bad, on the basis of, for example, the state of the received radio signal, and transmit the transmission radio signal.

A fifteenth aspect of the present invention is summarized as the radio communication device according to the first aspect, wherein the received radio signal uses a plurality of frequency bands, the radio communication device further comprising a frequency band correlation detector (propagation path fluctuation correlation value calculator 152) configured to detect degrees of correlation between the frequency bands, wherein the transmission controller changes the phases of a plurality of transmission radio signals in the same manner on the basis of the degrees of correlation detected by the frequency band correlation detector, in some of the frequency bands whose degree of correlation detected by the frequency band correlation detector is equal to or greater than a predetermined threshold.

According to the aspect, the radio communication device transmits the transmission radio signal by using the same weight in the plurality of frequency bands in which the degree of correlation is greater than or equal to a predetermined threshold. This eliminates the necessity of calculating a weight for each of the plurality of the frequency bands, so that the transmission radio signal can be transmitted by using a weight calculated for one frequency band. Accordingly, computation processing in calculating the weight can be reduced.

A sixteenth aspect of the present invention is summarized as a radio communication method used in a radio communication device configured to adaptively control directivity of a transmission radio signal by use of a plurality of element antennas on the basis of a received radio signal received from a counterpart radio communication device that is a communication target radio communication device, the transmission radio signal being to be transmitted to the counterpart radio communication device, the radio communication method comprising: a detection step of detecting a fluctuation state of a propagation path to the counterpart radio communication device on the basis of the received radio signal; and a control step of controlling a phase of the transmission radio signal on the basis of the detected fluctuation state of the propagation path.

According to the aspects of the present invention, a radio communication device and a radio communication method can be provided that can suppress degradation of communication quality even when a state of a propagation path to the radio communication device rapidly fluctuates because a communication target radio communication device of an object existing around the communication target radio communication device moves at high speed.

BRIEF DESCRIPTION OF THE DRAWINGS

FIG. 13 is an operation flowchart in the radio base station according to the third embodiment of the present invention.

BEST MODES FOR CARRYING OUT THE INVENTION

Figure 1:
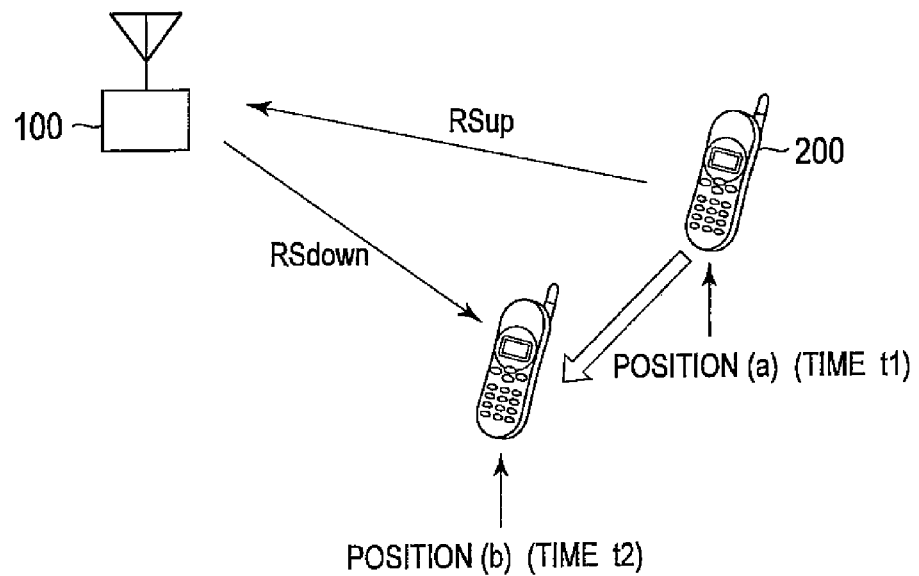
FIG. 1 is an overall schematic configuration diagram of a mobile communication system according to a first embodiment of the present invention.

Next, embodiments of the present invention will be described. In the following description of the drawings, note that a same or similar reference numeral is given to the same or similar part. However, it should be noted that the drawings are schematic.

First Embodiment of the Present Invention (Overall Schematic Configuration of Mobile Communication System According to First Embodiment)

FIG. 1 is an overall schematic configuration diagram of a mobile communication system including a radio communication device according to the present embodiment. The mobile communication system is provided with a radio base station 100 (radio communication device) and a radio communication terminal 200 (counterpart radio communication device). Note that the number of the radio base stations and the radio communication terminals configuring the mobile communication system is not limited to the number shown in FIG. 1.

In the mobile communication system, radio communications are performed between the radio base station 100 and the radio communication terminal 200. The mobile communication system is a mobile communication system that uses Time Division Multiple Access/Time Division Duplex (TDMA/TDD).

The radio communication terminal 200 is a mobile phone terminal provided with functions of transmitting and receiving voice communications or emails. In addition, mobile devices such as a mobile phone, a PDA (Personal Digital Assistant), or a notebook computer are assumed for the radio communication terminal 200.

In addition, FIG. 1 shows an image of the radio communication terminal 200 transmitting an uplink signal RSup at a position (a) at the time t1, and receiving a downlink signal RSdown when moving to a position (b) at the time t2.

The radio base station 100 performs adaptive array control by using a plurality of element antennas. Specifically, the radio base station 100 adaptively controls directivity of the downlink signal RSdown (transmission radio signal) to be transmitted to the radio communication terminal 200 that is a communication target radio communication device, on the basis of the uplink signal RSup (received radio signal) received from the radio communication terminal 200.

Figure 2:
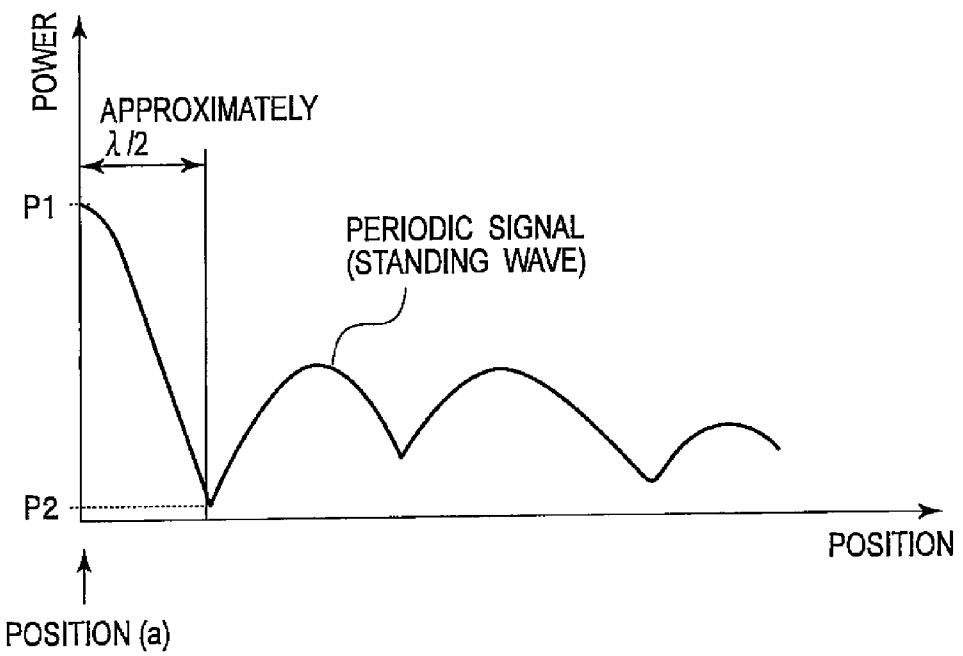
FIG. 2 is a chart showing a periodic signal (standing wave) around a radio communication device according to the first embodiment of the present invention.

In the radio communication terminal 200, a propagation path fluctuates due to changing surroundings such as movement of the radio communication terminal 200 itself or movement of an object therearound. Then, around the radio communication terminal 200, as shown in FIG. 2, for example, periodic signals periodically having peaks of electric power values, such as a standing wave, appear due to radio signals transmitted from the radio base station 100. A distance in such periodic signal from received power P1 of a peak to received power P2 of a null, i.e., a wavelength of the periodic signal is approximately 7.5 cm on the assumption that the wavelength of the periodic signal is almost half when the frequency of the radio signal is in a 2 GHz band, for example.

(Configuration of Radio Base Station According to First Embodiment)

Figure 3:
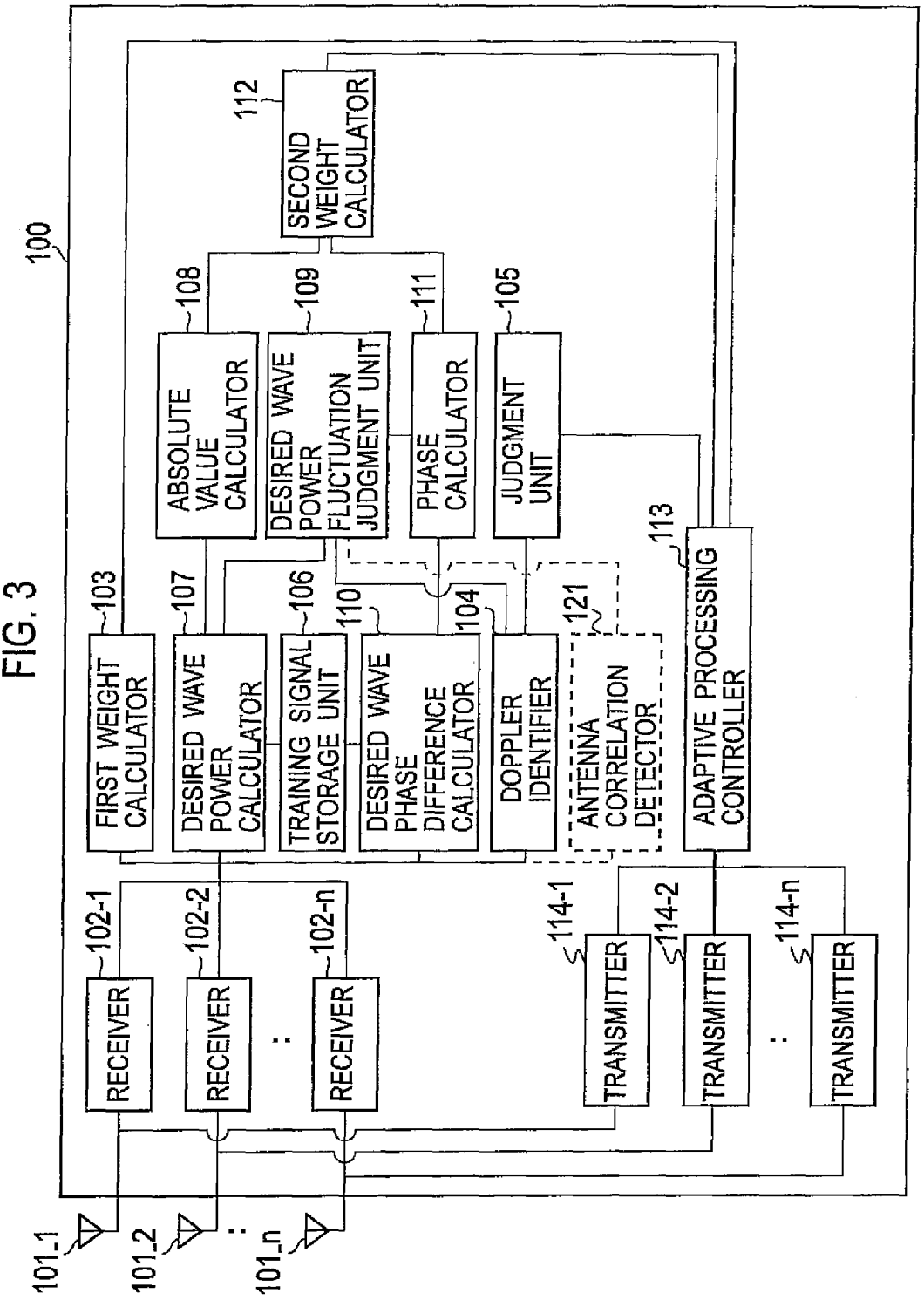
FIG. 3 is a functional block configuration diagram of a radio base station according to the first embodiment of the present invention.

FIG. 3 is a functional block configuration diagram of the radio base station 100 according to the present embodiment. In addition, parts relevant to the present invention will be mainly described in the following. Thus, it should be noted that the radio base station 100 may include a logical block (such as a power supply unit) that is essential in implementing functions as the radio base station 100 but that are not shown or a description of which is omitted.

As shown in FIG. 3, the radio base station 100 includes element antennas 101_1 to 101_$n$, receivers 102_1 to 102_$n$, a first weight calculator 103, a Doppler identifier 104, a judgment unit 105, a training signal storage unit 106, a desired wave power calculator 107, an absolute value calculator 108, a desired wave power fluctuation judgment unit 109, a desired wave phase difference calculator 110, a phase calculator 111, a second weight calculator 112, an adaptive processing controller 113, and transmitters 114_1 to 114_$n$.

The element antennas 101_1 to 101_$n$ are connected to the receivers 102_1 to 102_$n$ and the transmitters 114_1 to 114_$n$, and transmit and receive radio signals according to TDMA/TDD to and from the radio communication terminal 200.

The receivers 102_1 to 102_$n$ receive uplink signals RSup from the radio communication terminal 200 via the element antennas 101_1 to 101_$n$.

The first weight calculator 103 is connected to the receivers 102_1 to 102_$n$ and the adaptive processing controller 113. The first weight calculator 103 calculates a first array weight to be used in adaptive array control of a downlink signal RSdown to be is transmitted to the radio communication terminal 200 so that a peak is directed to a position (a) at time t2, on the basis of an uplink signal RSup at the time t1 of reception by the receivers 102_1 to 102_$n$. That is, the first array weight is calculated similarly to the conventional technique.

The Doppler identifier 104 is connected to the receivers 102_1 to 102_$n$, the judgment unit 105, and a desired wave power fluctuation judgment unit 109. The Doppler identifier 104 detects a cycle of fluctuation of an electric power value of the uplink RSup, as a cycle of fluctuation fa. Specifically, the Doppler identifier 104 periodically acquires received power values that vary with the Doppler variation due to movement of the radio communication terminal 200, for example, and also detects the cycle of fluctuation fa of fluctuation of the received power values. In the present embodiment, the Doppler identifier 104 constitutes a propagation path state detector.

The judgment unit 105 is connected to the Doppler identifier and the adaptive processing controller 113. In addition, the judgment unit 105 makes a comparison between the cycle of fluctuation fa detected by the Doppler identifier 104 and processing time $\Delta t$ from time t1 of receiving the uplink signal RSup from the radio communication terminal 200 to time t2 of transmitting the downlink signal RSdown. The judgment unit 105 judges whether or not the processing time $\Delta t$ is almost half of the cycle of fluctuation fa notified by the Doppler identifier 104.

Specifically, the judgment unit 105 has stored in advance a lower limit value fL and an upper limit value fH showing a range that is almost half of the cycle of fluctuation fa being the processing time $\Delta t$, and judges whether or not the cycle of fluctuation fa detected by the Doppler identifier 104 satisfies the lower limit value fL$\leq$fa<the upper limit value fH. Thus, in the judgment unit 105, it is judged whether or not the downlink signal RSdown is in the vicinity of a null at a position (b) of the time t2 of transmitting the downlink signal RSdown that forms a peak at the position (a) where the uplink signal RSup is received.

The training signal storage unit 106 stores a training signal (first known signal) to be used in radio communications with the radio communication terminal 200. Herein, the training signal represents a signal whose amplitude and phase values are known.

The desired wave power calculator 107 detects a fluctuation state of a propagation path to the radio communication terminal 200, on the basis of the uplink signal RSup. Specifically, based on the uplink signal RSup and the training signal, the desired wave power calculator 107 detects a received power value of the uplink signal RSup and desired wave received power relative to the training signal whose amplitude and phase are known, as a fluctuation state. Note that the desired wave power calculator 107 detects desired wave received power of each of the receivers 102_1 to 102_$n$. In the present embodiment, the desired wave power calculator 107 constitutes a propagation path state detector.

Based on the desired wave received power calculated by the desired wave power calculator 123, the absolute value calculator 108 calculates an absolute value of a weight to be used in the adaptive array control, by converting values of the desired wave received power so that magnitude thereof will be reversed.

The desired wave power fluctuation judgment unit 109 calculates variation of the desired wave received power values on the basis of the desired wave power value calculated last time with the desired wave power value calculated this time.

Alternatively, the desired wave power fluctuation judgment unit 109 may determine a predetermined threshold of variation of the desired wave received power on the basis of the result of the comparison between the cycle of fluctuation fa of the uplink signal RSup detected by the Doppler identifier 104 and the processing time Δt from the reception time t1 of the uplink signal RSup from the radio communication terminal 200 to the transmission time t2 of the downlink signal RSdown. Herein, the predetermined threshold is a value that serves as a criterion at the time when a phase calculator 111, to be described later, changes a phase of the down link signal RSdown. In addition, the desired wave power fluctuation judgment unit 109 judges whether or not the variation of the desired wave received power value of the uplink signal RSup detected by the desired wave power calculator 107 is less than or equal to the predetermined value, and notifies of the phase calculator 111 of the judgment result. In the present embodiment, the desired wave power fluctuation judgment unit 109 constitutes a transmission controller.

The desired wave phase difference calculator 110 detects a training signal (second known signal) whose amplitude and phase are known from the uplink signal RSup. Then, the desired wave phase difference calculator 110 calculates a phase difference between the desired wave in each of the receivers 102_1 to 102_n and the training signal on the basis of the detected training signal and the training signal (first known signal) stored in the training signal storage unit 106. In addition, the desired wave phase difference calculator 110 calculates variation of the phase difference on the basis of the phase difference calculated last time and the phase difference calculated this time. In the present embodiment, the desired wave phase difference calculator 110 constitutes a propagation path state detector.

The phase calculator 111 controls the phase of the downlink signal RSdown on the basis of the fluctuation state of the propagation path detected by the desired wave power calculator 107. In addition, the phase calculator 111 changes the phase of the downlink signal RSdown on the basis of a phase difference between the received power of the uplink signal RSup detected by the desired wave power calculator 107 and the training signal.

If the desired wave power fluctuation detector 109 judges that the variation of the received power value of the uplink signal RSup detected by the desired wave power calculator 107 is less or equal to the predetermined threshold, the phase calculator 111 changes the phase so that the phase of the downlink signal RSdown is reversed (for example, is advanced only by n). Then, the phase calculator 111 calculates a phase of a weight to be used in a second array weight. In the present embodiment, the phase calculator 111 constitutes a communication controller.

The second weight calculator 112 is connected to the absolute value calculator 108, the phase calculator 111, and the adaptive processing controller 113. The second weight calculator 112 calculates a second array weight to be used in the adaptive array control of the downlink signal RSdown to be transmitted to the radio communication terminal 200 so that a peak is directed to the position (b), by using the absolute value of the weight calculated by the absolute value calculator 108 and the phase of the weight calculated by the phase calculator 111.

When the judgment unit 105 judges that the processing time Δt is almost half of the cycle of fluctuation fa, the adaptive processing controller 113 controls the transmitters 114_1 to 114_n to transmit the downlink signals RSdown by use of the second array weight so that the peak is directed to the position (b) of the radio communication terminal 200 at the time t2.

In addition, when the judgment unit 105 judges that the processing time Δt is not almost half of the cycle of fluctuation, the adaptive processing controller 113 controls the transmitters 114_1 to 114_n to transmit the downlink signals RSdown by use of the first array weight so that the peak is directed to the position (a) where the radio communication terminal 200 is located at the reception time t1 of the uplink signal RSup.

The transmitters 114_1 to 114_n performs adaptive array processing according to the control of the adaptive processing controller 113 and transmits the downlink signals RSdown to the radio communication terminal 200 via the element antennas 101_1 to 101_n.

(Operation of Radio Base Station According to First Embodiment)

Figure 4:
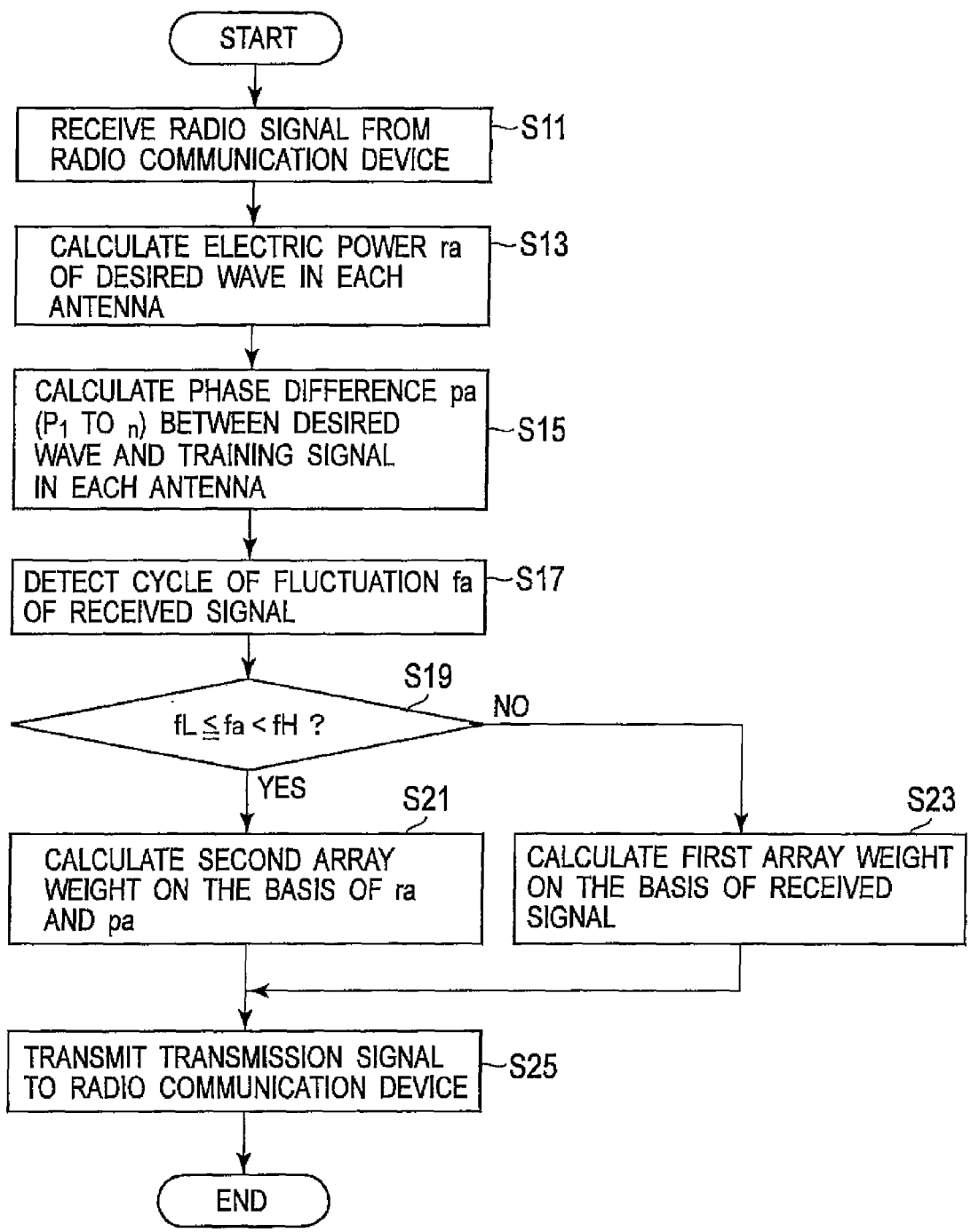
FIG. 4 is an operation flowchart in the radio base station according to the first embodiment of the present invention.

The operation of the aforementioned radio base station 100 will be described hereinafter with reference to FIG. 4. Specifically, description will be given of: control operation at the time when the radio base station 100 transmits a downlink signal RSdown (transmission radio signal) by using adaptive array control on the basis of an uplink signal RSup (received radio signal); and control operation in determining a predetermined threshold Thr and thereby calculating a weight.

(Control Operation in Transmitting Downlink Signal RSdown).

In step S11, the radio base station 100 receives a radio signal of the uplink signal RSup transmitted from the radio communication terminal 200.

In step S13, the desired wave power calculator 107 calculates desired value received power ra at each of the receivers 102_1 to 102_n, on the basis of the uplink signals RSup and a training signal. In addition, the absolute value calculator 108 calculates an absolute value of a weight to be used in the adaptive array control by converting values of the desired wave received power so that magnitude thereof will be reversed, on the basis of the desired wave received power ra calculated by the desired wave power calculator 123. Specifically, for example, where reference power is A and desired wave received power ra in each of the receivers 102_1 to 102_n notified by the desired wave power calculator 107 are A1, A2, A3 . . . An, the absolute value calculator 108 calculates the absolute values of the reversed weights after correction as (A-A1), (A-A2), (A-A3), . . . (A-An). Here, as an example, when the reference power is "1" and the desired wave received power A1 at is the receiver 101_1 is "0.3", the absolute value calculator 108 calculates an absolute value of the reversed weight as "0.7". The absolute value calculator 108 also notifies of the second weight calculator 112 of the calculated absolute value of the weight.

In step S15, the desired wave phase difference calculator 110 calculates a phase difference pa between the desired wave and the training wave in each of the receivers 102_1 to 102_n on the basis of the uplink signals RSup and the training signal.

In step S17, the Doppler identifier 104 detects a cycle of fluctuation fa of the received power value of the uplink signal RSup. The Doppler identifier 104 notifies the judgment unit 105 and the desired wave power fluctuation judgment unit 109 of the detected cycle of fluctuation fa.

In step S19, the judgment unit 105 judges whether or not the cycle of fluctuation fa detected by the Doppler identifier 104 satisfies the lower limit value fL≦fa<the upper limit value fH. The judgment unit 105 also notifies the adaptive processing controller 113 of the judgment result.

In step S21, (if fL≦fa<fH is YES), the adaptive processing controller 113 instructs the second weight calculator 112 to calculate a second array weight. The second weight calculator 112 calculates the second array weight and notifies the adaptive processing controller 113 of the second array weight.

In step S23, (if fL≦fa<fH is NO), the adaptive processing controller 113 instructs the first weight calculator 103 to calculate a first array weight. The first weight calculator 103 calculates the first array weight and notifies the adaptive processing controller 113 of the first array weight.

In step S25, the adaptive processing controller 113 transmits B the downlink signals RSdown from the transmitters 114_1 to 114_m, using the first array weight or the second array weight.

Note that, in the radio base station 100, the first weight or the second weight may be calculated (step S21 to 23) before the judgment unit 105 judges whether or not the lower limit value fL≦fa<the upper limit value fH (step S19).

(Control Operation in Determining Predetermined Threshold Thr and in Calculating Weight)

Figure 5:
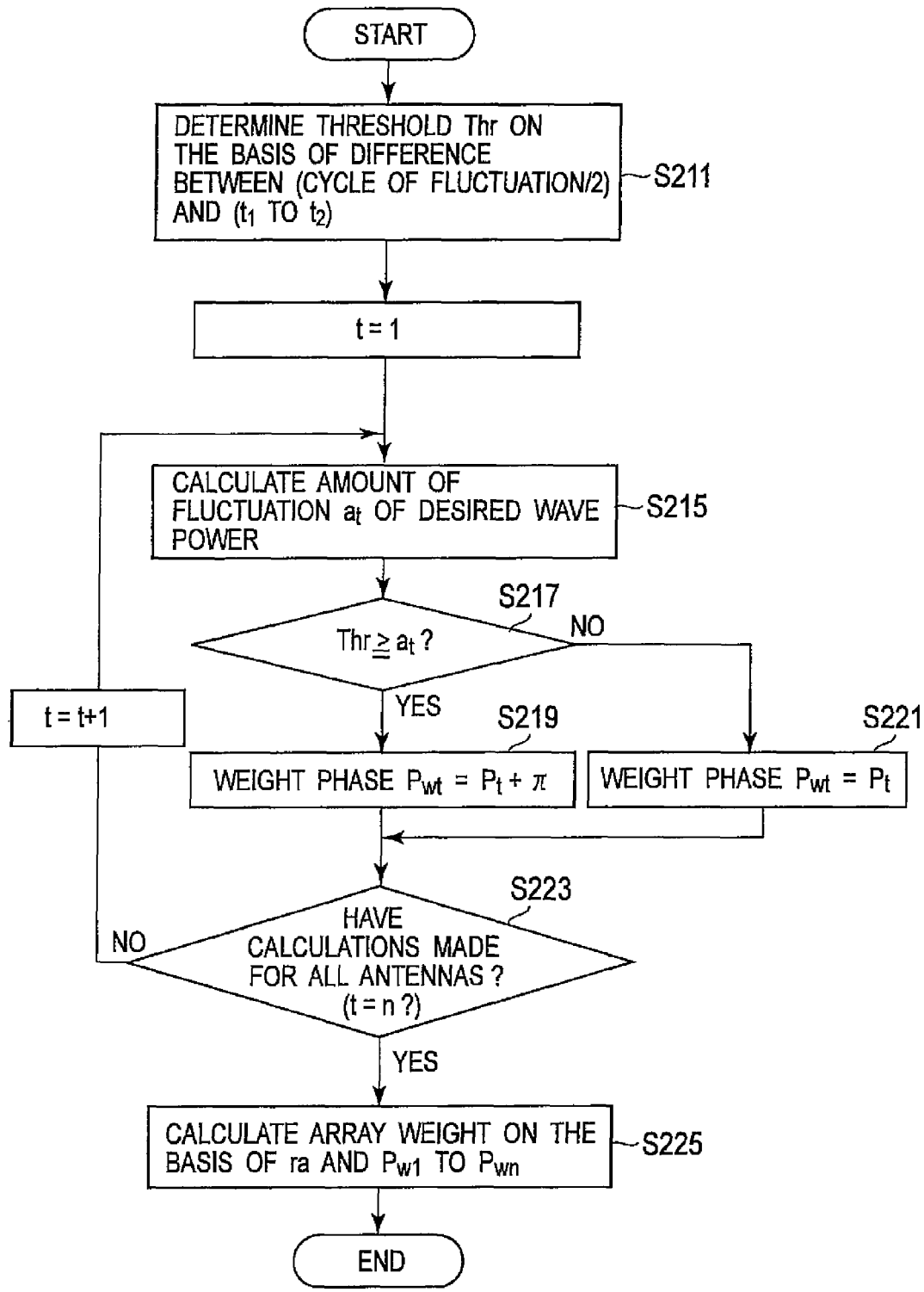
FIG. 5 is an operation flowchart in the radio base station according to the first embodiment of the present invention.

The control operation at the time when the radio base station 100 determines a predetermined value Thr and calculates a weight will be described hereinafter with reference to FIG. 5. Note that, in the radio base station 100, the control operation to be described below can replace step S19 to step S23 described above to be performed.

In step S211, the desired wave power fluctuation judgment unit 109 determines a predetermined threshold Thr indicative of an amount of fluctuation in desired wave received power on the basis of the result of the comparison with the cycle of fluctuation fa notified from the Doppler identifier 104.

Figure 6:
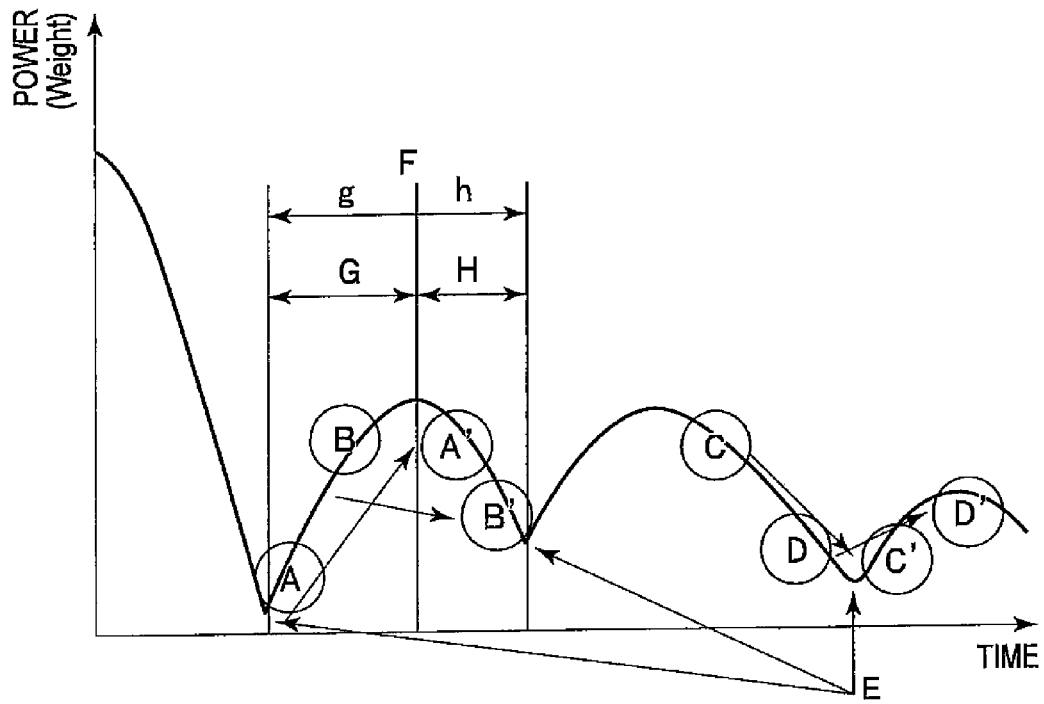
FIG. 6 is a chart showing received power in the radio base station according to the first embodiment of the present invention.

Now, the predetermined threshold Thr to be determined by the desired wave power fluctuation judgment unit 109 will be described with reference to FIG. 6. FIG. 6 shows variation in the time axis direction of the desired wave received power at the time when the uplink signal RSup transmitted from the traveling radio communication terminal 200 is received by one of the receivers (receiver 102_1, for example) of the radio base station 100. As shown in FIG. 6, influenced by Doppler variation, desired wave power to be received by the receiver 102_1 fluctuates due to movement of the radio communication terminal 200.

In addition, the radio base station 100 preferably transmits the downlink signal RSdown to the radio communication terminal 200 travelling during processing time Δt so that received power P2 will not be a null E of low received power, when transmitting the downlink signal RSdown on the basis of the received uplink signal RSup and by performing the adaptive array control.

Thus, at this time, in order for the radio base station 100 to direct a peak (beam) to the radio communication terminal 200 at the timing of transmission time t2 of the downlink signal RSdown, in a case where the received power is, for example, like A, B, C and D shown in FIG. 6 at each of the element antennas 101_1 to 101_n at the timing of the reception time t1 of the uplink signal RSup, the radio base station 100 preferably performs a correction to the absolute values of the weight A', B', C' and D', respectively, and also performs appropriate phase correction and transmits.

Thus, the desired wave power fluctuation judgment unit 109 reduces the predetermined threshold Thr of the amount of fluctuation (variation of "0", the boundary F between "G" and "H" in FIG. 6) (which is equivalent to shifting "F" in the direction of "h") if the cycle of fluctuation fa is small, while increasing the predetermined threshold (which is equivalent to shifting "F" in the direction of "g") if the cycle of fluctuation fa is large.

In step S215, the desired wave power fluctuation judgment unit 109 calculates an amount of fluctuation $a_t$ of the desired wave received power of the uplink signal RSup on the basis of the desired wave received power value fa calculated by the desired wave power calculator 107.

In step S217, the desired wave power fluctuation judgment unit 109 judges whether or not the calculated variation $a_t$ is less than or equal to the predetermined threshold Thr. Herein, the case in which the amount of fluctuation $a_t$ is less than or equal to the predetermined threshold Thr is the case of being in the range shown by "H" in FIG. 6. In addition, the case in which the amount of fluctuation $a_t$ is greater than the predetermined threshold Thr is the case of being in the range shown by "G" in the same figure. The desired wave power fluctuation judgment unit 109 also notifies the phase calculator 111 of the judgment result.

In step S219, (if predetermined threshold Thr≧amount of fluctuation $a_t$ is YES), the phase calculator 111 calculates a weight phase with the phase shifted by only π (180 degrees), where a phase of the weight of the element antenna 101_n is Pwt=PT+π.

In step S221, (if predetermined threshold Thr≧amount of fluctuation $a_n$ is NO), assuming that a phase of the element antenna 101_n is Pwt=Pt, the phase calculator 111 calculates a weight phase, without shifting the phase.

In step S223, the phase calculator 111 judges whether or not the weight phases Pwn corresponding to the number of all the element antennas 101_n are calculated. If the calculations have not been made for the number of all of the element antennas 101_n, the is operations in step S213 to step S223 are repeated.

In step S225, when the phase calculator 111 has calculated weight phases Pw1 to Pwn corresponding to the number of all the element antennas 101n, the phase calculator 111 notifies the second weight calculator 112 of the calculated weight phases Pw1 to Pwn.

The second weight calculator 112 calculates weights Wp1 to Wpn of respective element antennas 101_n on the basis of the weight phases Pwn and the absolute value of the weight calculated by the absolute values calculator 108.

Thus, the radio base station 100 determines the predetermined threshold Thr according to the cycle of fluctuation fa of the propagation path to the radio communication terminal 200, and calculates a weight on the basis of an appropriate phase.

Note that the radio base station 100 described above is configured to correct a phase of a weight when the amount of fluctuation of the desired wave received power value is less than or equal to the predetermined threshold Thr. However, when the received power value of the uplink signal RSup detected by the desired wave power calculator 107 decreases (fluctuates toward the null), the phase calculator 111 changes the weight phase of the downlink signal Rsdown by only π instead of using the threshold Thr. On the contrary, the radio base station may be configured not to change the downlink signal RSdown when the received power value of the uplink signal RSup detected by the desired wave power calculator 107 increases (fluctuates toward the peak).

(Operations and Effects of Radio Base Station According to First Embodiment)

The radio base station 100 according to the present embodiment performs the adaptive array control of the downlink signal RSdown to be transmitted to the radio communication terminal 200 by using the second array weight so that a peak is directed to the position (a), if it is judged that the processing time Δt is almost half of the cycle of fluctuation fa of the uplink signal RSup transmitted from the radio communication terminal 200.

Figure 7:
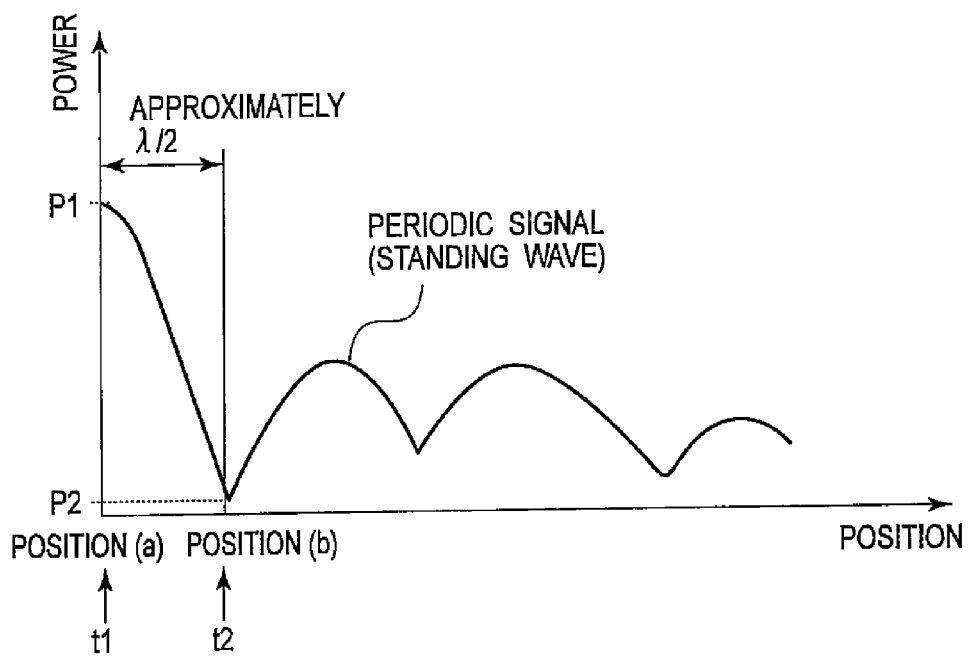
FIG. 7 is a chart showing a periodic signal (standing wave) around the radio communication terminal according to the first embodiment of the present invention.

As shown in FIG. 7, for example, when the radio communication terminal 200 travels to the position (b) located at almost half of the cycle of fluctuation fa, during the processing time Δt from the time t1 to the time t2, the radio base station 100 according to the conventional technique performs the adaptive array control on the basis of the uplink signal RSup at the position (a) at the time t1. Then, the radio base station 100 according to the conventional technique transmits the downlink signal RSdown so that the received power P1 is a peak at the position (a) at the time t2. Thus, in the radio communication terminal 200 that travels to the position (b) at the time t2, the received power received rapidly drops to the received power P2 of the null.

Figure 8:
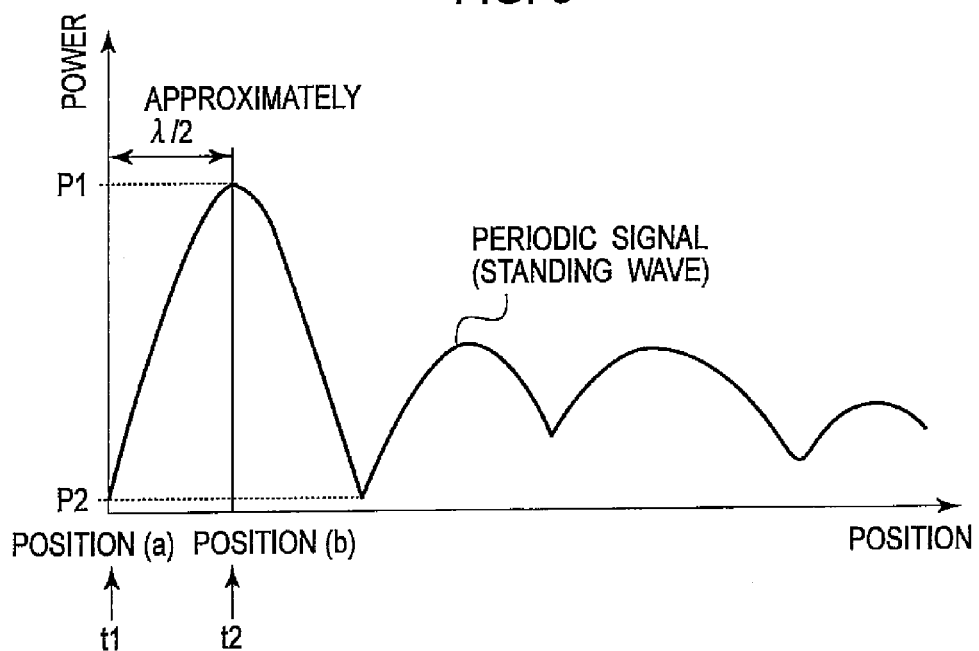
FIG. 8 is a chart showing the periodic signal (standing wave) around the radio communication terminal according to the first embodiment of the present invention.

When the radio communication terminal 200 travels a distance which is almost half of the wavelength $\lambda$, during the processing time $\Delta t$ from the time t1 to the time t2, the radio base station 100 according to the present invention performs the adaptive array control using the weight absolute value and the corrected second array weight so that the received power P2 is the peak at the position (a) at the time t2, and transmits the downlink signal Rsdown, for example, as shown in FIG. 8.

At this time, if the amount of fluctuation is less than or equal to the predetermined threshold, that is, if it is assumed that the received power will significantly drop due to a large phase shift, the second array weight is calculated with the phase of the weight whose phase is reversed on the basis of the amount of fluctuation of the desired wave received power. Thus, the radio base station 100 according to the present embodiment can appropriately control a phase of a weight to be used in the adaptive array control according to the amount of fluctuation of the desired wave received power, thereby transmitting the downlink signal RSdown.

In this way, the radio base station 100 can suppress degradation of the communication quality even in the case where state of the propagation path to the radio communication terminal 200 rapidly fluctuates because the radio communication terminal 200 or the object existing around the radio communication terminal 200 travels at high speed (100 km/h or higher).

In addition, the radio base station 100 according to the present embodiment changes a predetermined threshold of the amount of fluctuation which will serve as a criterion in changing the phase, with the cycle of fluctuation of the propagation path, and therefore can change the phase with appropriate threshold depending on the cycle of fluctuation fa.

In addition, the radio base station 100 according to the present embodiment calculates an absolute value of a weight to be used in the second array weight by converting values of the desired wave received power so that magnitude thereof will be reversed. Here, the case is taken as an example in which the uplink signal RSup is transmitted by the radio communication terminal 200 at the position (a) at the time t1 and the downlink signal RSdown is transmitted so that the received power is null at the position (b) due to the movement at the time t2. It is believed that the received power at the position (b) is higher when the radio base station 100 transmits downlink signal RS down by using the element antennas 101_1 to 101_n with small desired wave received power in the uplink signal RSup, rather than performing transmission by using the element antennas 101_1 to 101_n the desired wave received power of which is large.

In this way, when calculating a second array weight, the radio base station 100 according to the present embodiment calculates an absolute value of the weight by converting the desired wave received power values so that the magnitudes thereof are reversed. Note that the radio base station 100 according to the present embodiment can appropriately transmit the downlink signal RSdown to the radio communication terminal 200 even when the propagation path fluctuates.

(Modification 1)

The present invention shall not be limited to the above embodiment and various changes may be made thereto. In the radio base station 100 according to the first embodiment, the phase calculator 111 is configured to shift the weight phases of the element antennas 101_n PWn=Pn+$\pi$ only by $\pi$ (180 degrees). However, the phase calculator 111 may be configured to control an amount of change in the weight phase of the downlink signal RSdown not only by $\pi$, but also according to the amount of fluctuation of a phase difference.

Specifically, in the radio base station 100, if the desired wave received power that varies depending on the fluctuation of the propagation path shown in FIG. 6 is in the range of "H", the phase calculator 111 may be configured to control the amount of change in a phase, for example, in a range from $\pi/2$ to $\pi$, or from $(-\pi/2)$ to $(-\pi)$. In addition, at this time, the phase calculator 111 advances or delays the phase weight to be used in the downlink signal RSdown in the same direction as the fluctuation of the phase difference, in the case where the amount of fluctuation of the phase difference increases or in the case where the amount of fluctuation of the phase difference decreases. For instance, the phase calculator 111 may be configured to advance the weight phase (change the phase in a range from $(-\pi/2)$ to $(-\pi)$) to be used in the downlink signal RSdown when the amount of fluctuation of the phase difference increases. In addition, the phase calculator 111 may be configured to delay the weight phase to be used in the downlink signal RSdown (change the phase in a range from $\pi/2$ to $\pi$) when the amount of fluctuation of the phase difference decreases.

The radio base station 100 according to the present embodiment changes the weight phase to be used in the downlink signal RSdown according to the amount of fluctuation of the phase difference of the received uplink signal RSup, when performing the adaptive array control. Hence, the downlink signal RSdown can be transmitted with the peak (beam) directed to the traveling the radio communication terminal 200 more accurately, and therefore degradation of the communication quality can be suppressed.

(Modification 2)

The present invention shall not be limited to the above embodiment and various changes may be made thereto. The radio base station 100 according to the first embodiment may alternatively be configured to detect a cycle of Doppler variation of the uplink signal RSup as a cycle of fluctuation fa.

Here, the cycle of the Doppler variation to be detected as the cycle of fluctuation represents the frequency of the uplink signal RSup that Doppler-changed according to the traveling speed of the radio communication terminal 200. The Doppler identifier 104 notifies the judgment unit 105 of the detected cycle of fluctuation fa.

The judgment unit 105 judges whether or not the radio communication terminal 200 travels a distance that is almost half of a wavelength $\lambda$ of the frequency f being used in the radio signal, during the processing time $\Delta t$ described above.

Specifically, the judgment unit 105 stores in advance a lower limit value fL and an upper limit value fH of Doppler variation corresponding to the traveling speed at the time of moving the distance of almost half of the wavelength $\lambda$ of the frequency f used in the radio signal, during the processing time $\Delta t$. Then, the judgment unit 105 judges whether or not the cycle of fluctuation fa detected by the Doppler identifier 104 satisfies fL$\leq$fa<fH. In addition, the judgment unit 105 notifies the desired wave power fluctuation judgment unit 109 and the adaptive processing controller 113 of the judgment result. Note that other configurations are similar to the radio base station 100 according to the first embodiment described above, and therefore description thereof will be omitted.

With the radio base station 100 according to the present embodiment, the cycle of the Doppler variation as well as the cycle of fluctuation of the received power value can be used as cycle of fluctuation, when a predetermined threshold Thr is determined or when it is determined whether a first array weight or a second array weight is assigned.

(Modification 3)

The present invention shall not be limited to the above embodiment and various changes may be made thereto. The radio base station 100 according to the first embodiment may further include an antenna correlation detector 121, as shown in FIG. 3.

The antenna correlation detector 121 detects a degree of correlation of a downlink signal RSdown received by each of the plurality of element antennas. The antenna correlation detector 121 detects a degree of correlation of an uplink signal RSup received by each of the plurality of element antennas 101_1 to 101_n. Specifically, the antenna correlation detector 121 detects the degree of correlation of the plurality of element antennas 101_1 to 101_n on the basis of a phase and amplitude of the uplink signal RSup received by each of the receivers 102_1 to 102_n. Here, if the degree of correlation detected by the antenna correlation detector 121 is high, in the radio communication terminal 200, the cycle of fluctuation fa due to fluctuation of the propagation path becomes longer in a periodic signal (standing wave, for example) therearound. In addition, the antenna correlation detector 121 notifies the desired wave power fluctuation judgment unit 109 of the detected degree of correlation.

In addition, the desired wave power fluctuation judgment unit 109 that receives the notification determines a predetermined threshold Thr on the basis of the degree of correlation detected by the antenna correlation detector 121. Note that other configurations are similar to the radio base station 100 according to the first embodiment described above, and therefore description thereof will be omitted.

As described above, with the radio base station 100 according to the present embodiment, the desired wave power fluctuation judgment unit 109 can determine the predetermined threshold Thr of the amount of fluctuation in consideration of the cycle of fluctuation fa, for example, by reducing the predetermined threshold, for example, when the degree of correlation detected by the antenna correlation detector 121 is high, that is, when the cycle of fluctuation fa in the periodic signal (standing wave) around the radio communication terminal 200 is long.

(Modification 4)

The present invention shall not be limited to the above embodiment and various changes may be made thereto. In the radio base station 100 according to the first embodiment, the desired wave power fluctuation judgment unit 109 determines the amount of fluctuation of received power value on the basis of the received power values of the uplink signal RSup at least at first timing and at second timing that is later than the first timing. Then, the desired wave power fluctuation judgment unit 109 changes the phase of the downlink signal RSdown on the basis of a phase difference of the uplink signal RSup at the first timing, if the amount of fluctuation of the determined received power value has decreased.

At this time, the desired wave power fluctuation judgment unit 109 determines the amount of fluctuation of received power value on the basis of received power values of the uplink signal RSup at least at first timing and at second timing that is later than the first timing. Then, the desired wave power fluctuation judgment unit 109 changes the phase of the downlink signal RSdown on the basis of the phase difference of the uplink signal RSup at the second timing, if the amount of fluctuation of the determined received power value has increased.

Specifically, the desired wave power fluctuation judgment unit 109 according to the present invention judges whether or not the amount of fluctuation $a_n$ of the calculated desired wave received power is less than or equal to a predetermined threshold Thr, and also judges whether or not the amount of fluctuation $a_n$ increases or decreases. Then, the desired wave power fluctuation judgment unit 109 notifies the phase calculator 111 of the judgment result and the uplink signal RSup at the first timing and the second timing.

Depending on the judgment result and the phases of the uplink is signal RSup, the phase calculator 111 changes the phase of the downlink signal RSdown on the basis of the second timing if the amount of fluctuation $a_n$ has increased, whereas changes the phase of the downlink signal RSdown on the basis of the first timing if the amount of fluctuation $a_n$ has decreased.

Figure 9:
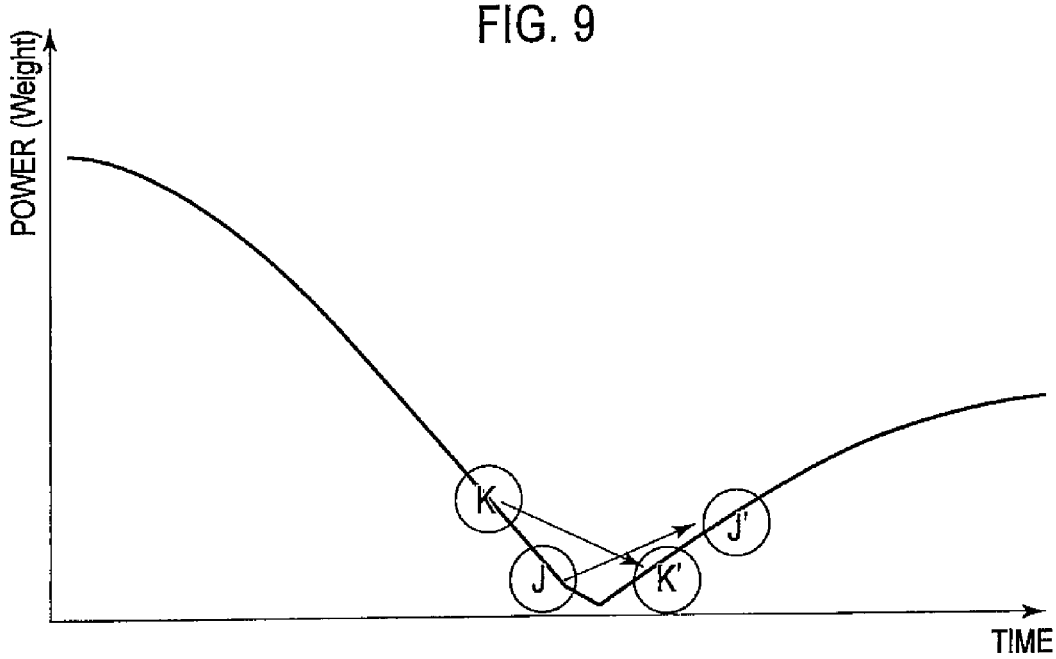
FIG. 9 is a chart showing received power in a radio base station according to a modification of the present invention.

Here, FIG. 9 shows an enlarged view of the null E shown in FIG. 6. As shown in FIG. 9, regarding the desired wave received power value to be used in the amount of fluctuation $a_n$, the case in which the amount of fluctuation of the desired wave received power value increases as shown in "J" to "J'" and the case in which the amount of fluctuation of the desired wave received power decreases as shown in "K" to "K'" are conceivable in the desired wave fluctuation judgment unit 109. If the amount of fluctuation of the desired wave received power decreases as shown in "K" to "K'", the phase calculator 111 considers the changing of the phase and calculates a weight phase on the basis of a phase difference at "K" at a time when the amount of fluctuation of the desired wave received power almost decreases.

By contrast, if the amount of fluctuation of the desired wave power increases as shown in "J" to "J'," the phase calculator 111 considers the changing of the phase and calculates a weight phase on the basis of the phase difference at "J'" when the amount of fluctuation of the desired wave received power almost increases.

In this way, the radio base station 100 according to the present modification changes a phase of the uplink signal RSup at timing that is closer to the peak and calculates a weight phase appropriately, depending on whether the amount of fluctuation of the desired wave received power of the uplink signal RSup at the first timing and at the second timing has increased or decreased.

Second Embodiment of the Present Invention

For a configuration of a radio base station 100 according to a second embodiment of the present invention, differences from the first embodiment described above will be described hereinafter. In the following, parts different from the radio base station 100 of the first embodiment will be mainly described and description of similar functions will be omitted as appropriate.

(Configuration of Radio Base Station 100 According to Second Embodiment)

Figure 10:
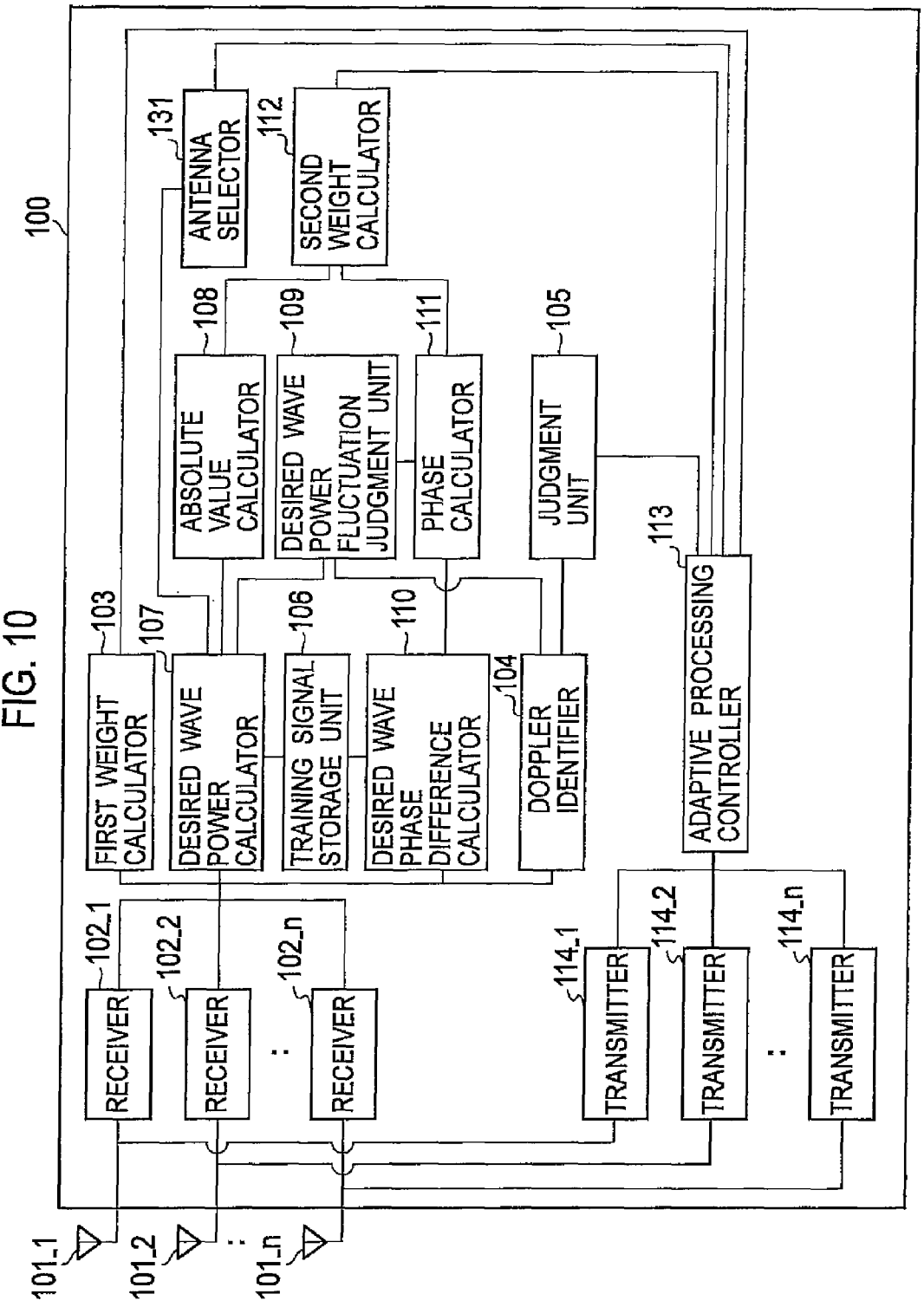
FIG. 10 is a functional block configuration diagram of a radio communication terminal according to a second embodiment of the present invention.

In the present embodiment, in the radio base station 100 according to the first embodiment, the radio base station 100 according to the present embodiment further includes an antenna selector 131, as shown in FIG. 10.

The antenna selector 131 is connected to a desired wave power calculator 107 and an adaptive processing controller 113. The antenna selector 131 selects at least any of element antennas 101_1 to 101_n on the basis of a state of a received radio signal. Specifically, on the basis of each of desired wave received power values of receivers 102_1 to 102__n calculated by the desired power wave calculator 107, the antenna selector 131 selects a plurality of the element antennas 101_1 to 101__n with the smallest desired wave received power or with the desired wave received power in the ascending order. In addition, the antenna selector 131 notifies the adaptive processing controller 113 of the selected element antennas 101_1 to 101__n.

When the judgment unit judges that processing time Δt is almost half of the cycle of fluctuation fa, the adaptive processing controller 113 performs the adaptive array control by using a second array weight. At this time, the adaptive processing controller 113 transmits the downlink signal RSdown by the adaptive array control that assigns the second array weight calculated by a second weight calculator 112 via transmitters including the element antennas 101_1 to 101__n selected by the antenna selector 131. In the present embodiment, the adaptive processing controller 113 constitutes a transmission controller.

(Operation of Radio Base Station According to Second Embodiment)

Figure 11:
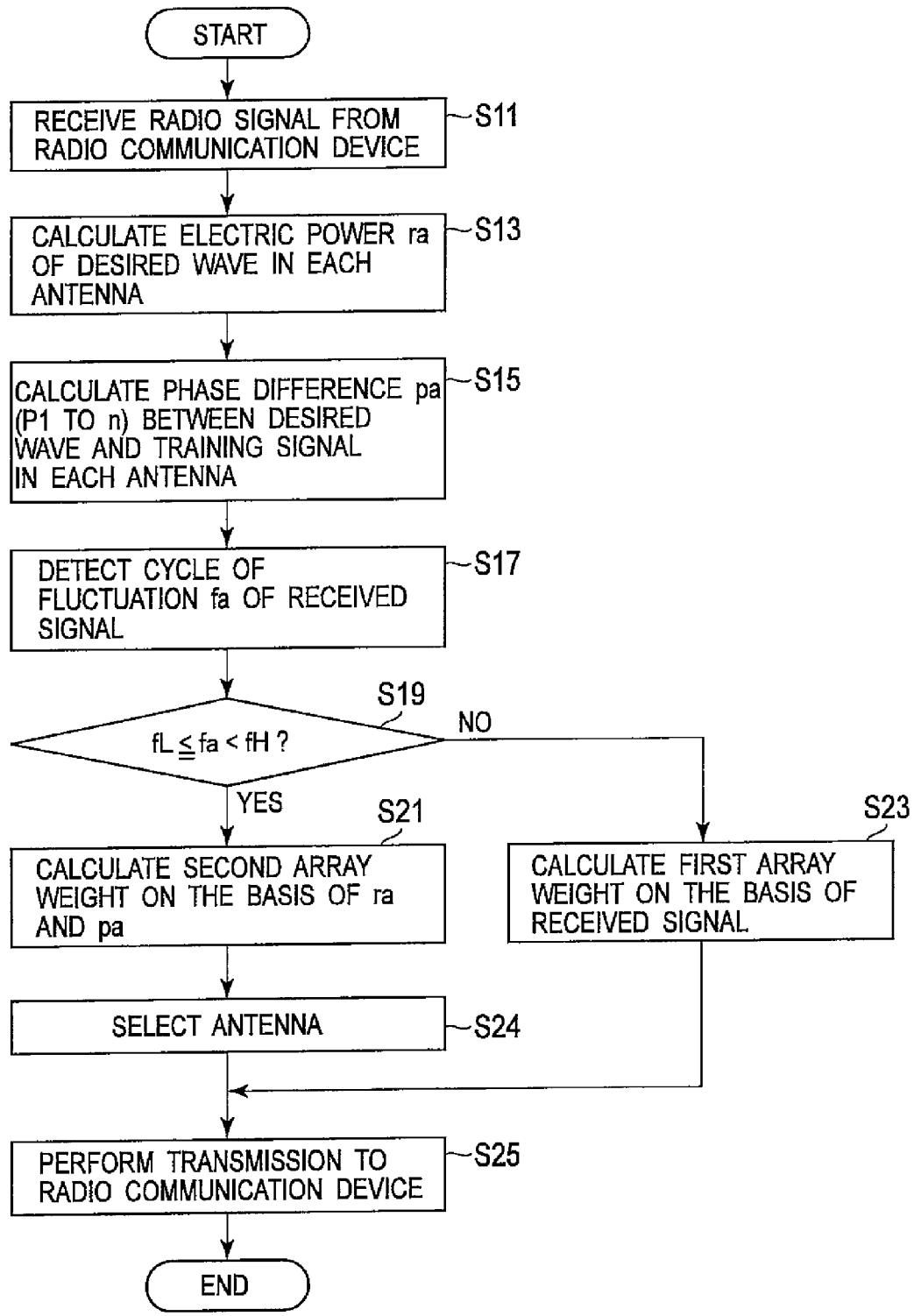
FIG. 11 is an operation flowchart in the radio base station according to the second embodiment of the present invention.

The operation of the radio base station 100 according to the present embodiment will be described with reference to FIG. 11. Note that only step S24 is added to the radio base station 100 according to the present embodiment in comparison with the operation of the radio base station 100 according to the first embodiment described above. Thus, in the present embodiment, the operation of the step S24 and step S25 will be mainly described.

In step S24, based on each desired wave received power ra of the receivers 102_1 to 102__n the antenna selector 131 selects a plurality of the element antennas 101_1 to 101__n with the smallest desired wave received power or with the desired wave received power in the ascending order. In addition, the antenna selector 131 notifies the adaptive processing controller 113 of the selected element antennas 101_1 to 101__n.

In step S25, the adaptive processing controller 113 performs the adaptive array control by using a second array weight, for example. In addition, when transmitting a downlink signal RSdown to the radio communication terminal 200, the adaptive processing controller 113 transmits the downlink signal RSdown via the transmitters including the notified element antennas 101_1 to 101__n.

(Operations and Effects of Radio Base Station According to Second Embodiment)

The radio base station 100 according to the present is embodiment performs the adaptive array control with the second array weight by using the plurality of element antennas 101_1 to 101__n with the smallest desired wave received power or with the desired wave received power in the ascending order, when the judgment unit 105 judges that the processing time Δt is almost half of the cycle of fluctuation fa.

Here, in a case where the propagation path fluctuates in a manner that the radio communication terminal 200 moves to a null (valley) of a periodic signal (standing wave), at the time t2 when the radio base station 100 transmits the downlink signal RSdown, it is believed that magnitude of the desired wave power at the reception time t1 of the uplink signal RSup and an absolute value of the weight at the transmission time t2 of the downlink signal RSdown will be reversed with a high possibility. Accordingly, the radio base station 100 transmits the downlink signals RSdown by using the element antennas with the small desired wave power selected by the antenna selector 131, and thereby the radio communication terminal 200 can acquire excellent communication quality at a position (b) at the reception time t2 of the downlink signals RSdown.

The operation of the radio base station 100 according to the present embodiment will be described by focusing on differences from the present embodiments described above. In the following, parts different from the radio base station 100 of the first embodiment will be mainly described and description of similar functions will be omitted as appropriate.

(Configuration of Radio Base Station 100 According to Third Embodiment)

In the radio base station 100 according to the present embodiment, an uplink signal RSup and a downlink signal RSdown to be transmitted/received to/from the radio communication terminal 200 use a plurality of frequency bands.

Figure 12:
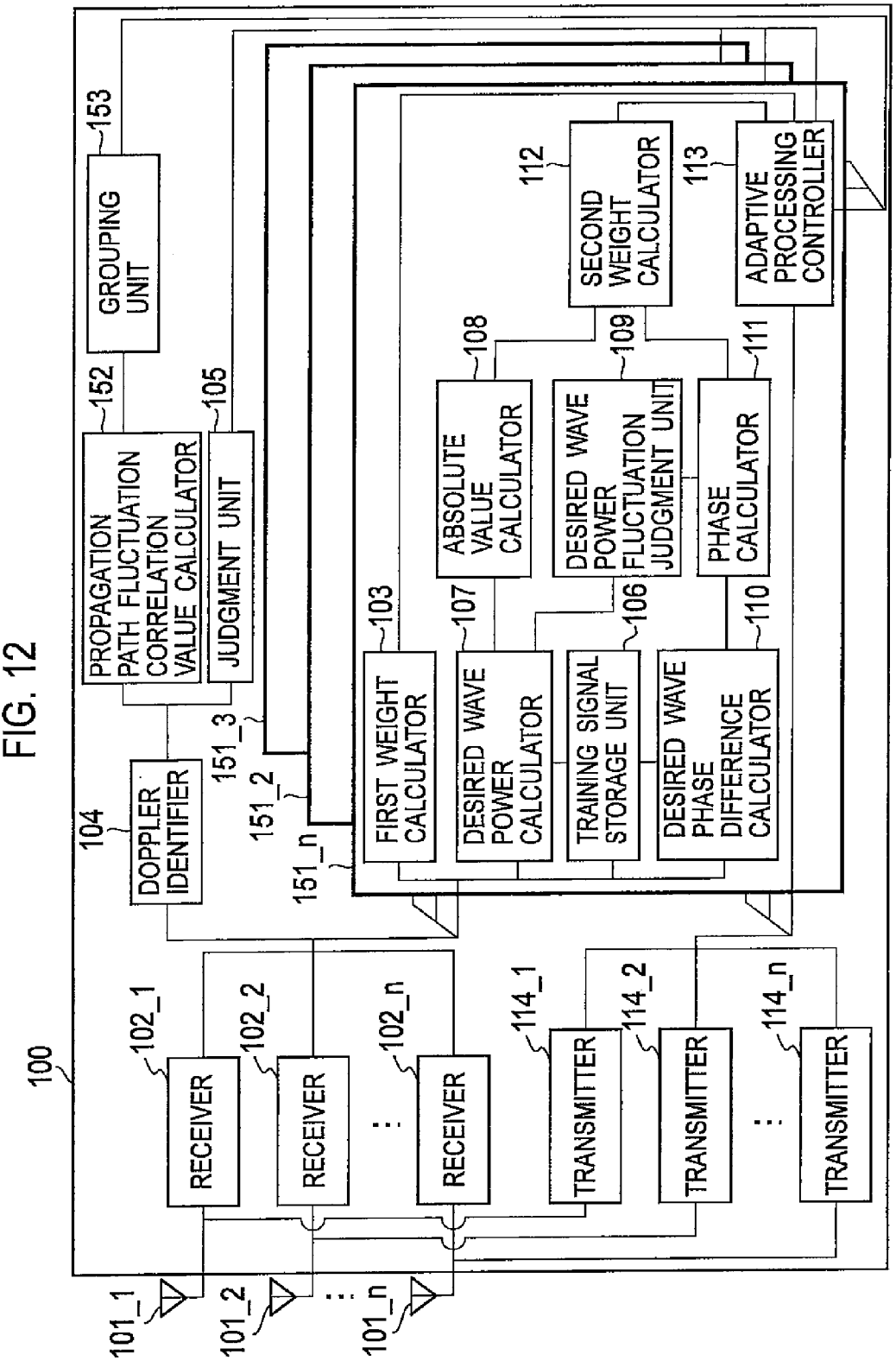
FIG. 12 is a functional block configuration diagram of a radio base station according to a third embodiment of the present invention.

In addition, as shown in FIG. 12, the radio base station 100 according to the present embodiment further includes adaptive controllers 151_1 to 151_3, a propagation path fluctuation correlation value calculator 152, and a grouping unit 153, when compared with the radio base station 100 according to the first embodiment. Note that, although the case in which the radio base station 100 according to the present embodiment includes three adaptive controllers 151_1 to 151_3 is described as an example, the number shall not be limited to this.

The propagation path correlation value calculator 152 is connected to a Doppler identifier 104 and a grouping unit 153. The propagation path fluctuation correlation value calculator 152 performs correlation computation of fluctuation of propagation is path on each of the plurality of frequency bands with each other, and calculates a correlation value of each frequency band. In addition, the propagation path fluctuation correlation value calculator 152 notifies the grouping unit 153 of the calculated correlation value. In the present embodiment, the propagation path fluctuation correlation value calculator 152 constitutes a frequency band correlation detector for detecting a degree of correlation of each of the frequency bands.

The grouping unit 153 is connected to the propagation path fluctuation correlation value calculator 152 and the adaptive controllers 151_1 to 151_3. Based on the degrees of correlation detected by the propagation path fluctuation correlation value calculator 152, the grouping unit 153 similarly changes phases of a plurality of downlink signals RSdown for the plurality of frequency bands whose degree of correlation is greater than or equal to a predetermined threshold.

Specifically, the grouping unit 153 groups the correlation values calculated by the propagation path fluctuation correlation value calculator 152 so that adaptive controllers 151_1 to 151_3 corresponding to frequency bands greater than or equal to the predetermined threshold that has been stored in advance belong to a same group. Then, the grouping unit 153 makes notification to the adaptive controllers 151_1 to 151__n grouped into the same group. In the present embodiment, the grouping unit 153 constitutes a transmission controller.

The adaptive controllers 151_1 to 151_3 are connected to the receivers 102_1 to 102__n, the judgment unit 105, the grouping unit 153, and the transmitters 114_1 to 114__n. The adaptive controllers 151_1 to 151_3 are configured to perform the adaptive array control on each different frequency band, in the downlink signals RSdown.

In addition, in the adaptive controllers 151_1 to 151__n that have been notified of the belonging to the same group by the grouping unit 153, only one in the group is used to calculate a first array weight or a second array weight. Then, the adaptive controllers 151_1 to 151_3 that have been notified of the belonging to the same group by the grouping unit 153 share the result thereof in the group, and each of the adaptive controller 113 performs the adaptive array control.

Note that each of the adaptive controllers 151_1 to 151_3 is similarly configured, and therefore a configuration of the adaptive controller 151_1 will be described.

The adaptive controller 151_1 includes a first weight calculator 103, a second weight calculator 112, and an adaptive processing controller 113.

A configuration of the first weight calculator 103 and that of the second weight calculator 112 are similar to those in the first embodiment as described above.

Upon receipt of a notification of the belonging to a same group as other adaptive controllers 151_2 to 1551_3, from the grouping unit 153, the adaptive processing controller 113 shares the calculated first or second array weight with the adaptive controller 151_2 to 151_3 belonging to the same group, and performs the adaptive array control.

(Operation of Radio Base Station According to Third Embodiment)

The operation of the radio base station 100 according to the present embodiment will be described with reference to FIG. 13 by focusing on differences from the present embodiments described above. Note that only step S12a to S12b and S24 have been added in the radio base station 100 according to the present embodiment in comparison with the operation of the radio base station 100 according to the first embodiment described above. Thus, in the present embodiment, the operation of the steps S12a to S12b and step S24 will be mainly described.

In step S12a, the propagation path fluctuation correlation value calculator 152 performs correlation computation of propagation path fluctuation on each of the multiple frequency bands with each other, calculates each correlation value, and makes notification to the grouping unit 153.

In step S12b, the grouping unit 153 groups the adaptive controllers 151_1 to 151_3 corresponding to the frequency bands whose correlation values are greater than or equal to the predetermined threshold. The grouping unit 155 notifies the adaptive controllers 151_1 to 151_3 belonging to a same group of the belonging to the same group. Then, the grouping unit 153 specifies one adaptive controller (the adaptive controller 151_1, for example), and instructs the identified adaptive controller to calculate a first or a second array weight.

Upon receipt of the instruction to calculate the first or the second array weight from the grouping unit 153, the adaptive controller 151_1, for example, performs the operation of step S13 to step S23. Note that the operation of the step S13 and step S23 is similar to that in the first embodiment.

Subsequently, in step S24, in the adaptive controller 151_1, for example, that receives the notification from the grouping unit 153, the adaptive processing controller 113 notifies the adaptive controllers 151_2 to 151_3 in the same group of the first or the second array weight.

In step S25, the adaptive processing controller of each of the adaptive controllers 151_1 to 151_3 uses the notified first array weight or second array weight and transmits downlink signals from the transmitters 114_1 to 114_n.

In this way, the adaptive processing controllers 113 included in the respective adaptive controllers 151_1 to 151_3 according to the present embodiment are grouped for multiple frequency bands whose degree of correlation detected by the propagation path fluctuation correlation value calculator 152 is greater than or equal to the predetermined threshold. Note that the adaptive processing controllers 113 provided to the respective adaptive controllers 151_1 to 151_3 according to the present embodiment transmit the uplink signals RSup using the same second array weight with the null directed to the position (a) where the radio communication terminal 200 is located at the reception time t1 or using the same first array weight with the peak directed to the position (a).

(Operations and Effects of Radio Base Station According to Third Embodiment)

With the radio base station 100 according to the present embodiment, the adaptive controllers 151_1 to 151_3 whose correlation values of multiple frequency bands correspond to frequency bands greater than or equal to the predetermined threshold are grouped, share one first or second array weight in the same group, and transmit downlink signals RSdown to the radio communication terminal 200. Accordingly, an increase of load of computation processing can be suppressed in comparison with the case in which the adaptive controllers 151_1 to 151_3 for each of the multiple frequency band calculate a first or a second array weight.

Other Embodiments

As described above, content of the present invention has been disclosed through one embodiment of the present invention. However, it should not be construed that the description and drawings constituting a part of this disclosure will limit the present invention. Various alternative embodiments will be apparent to those skilled in the art from this disclosure.

For example, in the present embodiments as described above, the radio base station 100 is configured to serve as a radio communication device. However, the radio communication terminal 200, for example, may be configured to serve as a radio communication device. In addition, the radio base station 100 may be configured to serve as a counterpart radio communication device.

In addition, if the radio communication terminal 200 is equipped with a position detection function such as a GPS and a traveling speed detection function, and the like, the radio base station 100 may be configured to select a first array weight or a second array weight, according to a position or a traveling speed detected by the radio communication terminal 200.

It is also possible to combine each of configurations of embodiments and configurations of modifications. In addition, the operations and effects of each embodiment and each modification simply list the most preferable operations and effects of the present invention. Thus, the operations and effects of the present invention shall not be limited to description of each of the embodiments and modifications.

In this way, it is needless to say that the present invention contains various embodiments that have not been described herein. Thus, a technical scope of the present invention shall be defined only by inventive specific matters according to the scope of claims that are reasonable from the above description.

Note that the content of Japanese Patent Application No. 2006-256542 (filed on Sep. 21, 2006) is incorporated herein by reference in their entirety.

INDUSTRIAL APPLICABILITY

As described above, the radio communication device and the radio communication method according to the present invention are capable of suppressing degradation of the communication quality even in the case where the state of the propagation path to a communication target radio communication device rapidly fluctuates because the radio communication device or an object existing around the communication target communication device moves at high speed, and therefore are useful in radio communications such as mobile communications.

The invention claimed is:

1. A radio communication device which adaptively controls directivity of a transmission radio signal by use of a plurality of element antennas on the basis of a received radio signal received from a counterpart radio communication device that is a communication target radio communication device, the transmission radio signal being to be transmitted to the counterpart radio communication device, the radio communication device comprising:
a known signal storage unit configured to store a signal transmitted from the counterpart radio communication device as a first known signal;
a propagation path state detector configured to detect a second known signal whose amplitude and phase are known, from the received radio signal, and
a transmission controller configured to change the phase of the transmission radio signal on the basis of a phase difference between the first known signal stored in the known signal storage unit and the second known signal detected by the propagation path state detector.

2. The radio communication device according to claim 1, wherein
the propagation path state detector detects a received power value of the received radio signal, and
the transmission controller changes the phase of the transmission radio signal when an amount of fluctuation of the received power value of the received radio signal detected by the propagation path state detector is less than or equal to a predetermined threshold.

3. The radio communication device according to claim 2, wherein the transmission controller determines the predetermined threshold on the basis of a result of a comparison between the cycle of fluctuation identified by the propagation path state detector and processing time from the time of receiving the received radio signal from the counterpart radio communication device to the time of transmitting the transmission radio signal.

4. The radio communication device according to claim 3, wherein the propagation path state detector detects a cycle of Doppler variation of the received radio signal as the cycle of fluctuation.

5. The radio communication device according to claim 3, wherein the propagation path state detector detects the cycle of fluctuation of the electric power value of the received radio signal as the cycle of fluctuation.

6. The radio communication device according to claim 1, wherein
the propagation path state detector detects a received power value of the received radio signal; and
the transmission controller reverses the phase of the transmission radio signal when the amount of fluctuation of the received power value of the received radio signal detected by the propagation path state detector is less than or equal to a predetermined threshold.

7. The radio communication device according to claim 1, wherein the transmission controller controls an amount of change of the phase of the transmission radio signal, according to the amount of fluctuation of the phase difference.

8. The radio communication device according to claim 7, wherein the transmission controller advances the phase of the transmission radio signal when the amount of fluctuation of the phase difference increases.

9. The radio communication device according to claim 8, further comprising:
an antenna correlation detector configured to detect degrees of correlation between received radio signals respectively received by the plurality of element antennas, wherein
the transmission controller determines the predetermined threshold on the basis of the degrees of correlation detected by the antenna correlation detector.

10. The radio communication device according to claim 7, wherein the transmission controller delays the phase of the transmission radio signal when the amount of fluctuation of the phase difference decreases.

11. The radio communication device according to claim 1, wherein the transmission controller:
judges an amount of fluctuation between received power values on the basis of the received power values of the received radio signal at least at first timing and at second timing that is later than the first timing; and
changes the phase of the transmission radio signal on the basis of the phase difference of the received radio signal at the first timing, if the judged amount of fluctuation of the received power value shows a decrease.

12. The radio communication device according to claim 1, wherein the transmission controller:
judges an amount of fluctuation between received power values on the basis of the received power values of the received radio signal at least at first timing and at second timing that is later than the first timing; and
changes the phase of the transmission radio signal on the basis of the phase difference of the received radio signal at the second timing, if the judged amount of fluctuation of the received power value shows an increase.

13. A radio communication device which adaptively controls directivity of a transmission radio signal by use of a plurality of element antennas on the basis of a received radio signal received from a counterpart radio communication device that is a communication target radio communication device, the transmission radio signal being to be transmitted to the counterpart radio communication device, the radio communication device comprising:
a propagation path state detector configured to detect a fluctuation state of a propagation path to the counterpart radio communication device on the basis of the received radio signal;
a transmission controller configured to control a phase of the transmission radio signal on the basis of the fluctuation state of the propagation path detected by the propagation path state detector; and
an antenna selector configured to select at least any one of the element antennas with a small desired wave received power on the basis of a state of the received radio signal, wherein
the transmission controller transmits the transmission radio signal via the element antenna selected by the antenna selector.

14. A radio communication device which adaptively controls directivity of a transmission radio signal by use of a plurality of element antennas on the basis of a received radio signal received from a counterpart radio communication device that is a communication target radio communication device, the transmission radio signal being to be transmitted to the counterpart radio communication device, the radio communication device comprising:

a propagation path state detector configured to detect a fluctuation state of a propagation path to the counterpart radio communication device on the basis of the received radio signal; and a transmission controller configured to control a phase of the transmission radio signal on the basis of the fluctuation state of the propagation path detected by the propagation path state detector, wherein the received radio signal uses a plurality of frequency bands, the radio communication device further comprising a frequency band correlation detector configured to detect degrees of correlation between the frequency bands, wherein the transmission controller changes the phases of a plurality of transmission radio signals in the same manner on the basis of the degrees of correlation detected by the frequency band correlation detector, in some of the frequency bands whose degree of correlation detected by the frequency band correlation detector is equal to or greater than a predetermined threshold.

15. A radio communication method used in a radio communication device configured to adaptively control directivity of a transmission radio signal by use of a plurality of element antennas on the basis of a received radio signal received from a counterpart radio communication device that is a communication target radio communication device, the transmission radio signal being to be transmitted to the counterpart radio communication device, the radio communication method comprising:

a step of storing a signal transmitted from the counterpart radio communication device as a first known signal;

a step of detecting a second known signal whose amplitude and phase are known, from the received radio signal; and a step of a changing the phase of the transmission radio signal on the basis of a phase difference between the first known signal stored in the storing step and the second known signal detected by the detecting step.

* * * * *